United States Patent
Deora et al.

(10) Patent No.: US 11,546,334 B2
(45) Date of Patent: Jan. 3, 2023

(54) CLIENT DEVICE CONFIGURATION FOR REMOTE DIGITAL WORKSPACE ACCESS

(71) Applicant: Citrix Systems, Inc., Fort Lauderdale, FL (US)

(72) Inventors: Divyansh Deora, Bengaluru (IN); Anirudh Katoch, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 294 days.

(21) Appl. No.: 16/524,493

(22) Filed: Jul. 29, 2019

(65) Prior Publication Data

US 2021/0037015 A1    Feb. 4, 2021

(51) Int. Cl.
*H04L 9/40* (2022.01)
*H04W 12/08* (2021.01)
*H04W 12/06* (2021.01)
*G06F 9/451* (2018.01)

(52) U.S. Cl.
CPC ........ *H04L 63/101* (2013.01); *H04L 63/0861* (2013.01); *H04W 12/06* (2013.01); *H04W 12/08* (2013.01); *G06F 9/452* (2018.02)

(58) Field of Classification Search
CPC . H04L 63/0861; H04L 63/083; H04L 63/101; H04L 63/0853; H04W 12/06; H04W 12/08
See application file for complete search history.

(56) References Cited

U.S. PATENT DOCUMENTS

| | | | |
|---|---|---|---|
| 6,563,800 B1 * | 5/2003 | Salo | H04W 12/02 370/264 |
| 8,800,007 B1 | 8/2014 | Rajagopalan | |
| 9,152,960 B2 * | 10/2015 | Chetal | G06V 10/94 |
| 10,021,089 B2 * | 7/2018 | Mortimore, Jr. | H04L 63/0838 |

(Continued)

OTHER PUBLICATIONS

I. Nakouri, M. Hamdi and T.-H. Kim, "A new biometric-based security framework for cloud storage," 2017 13th International Wireless Communications and Mobile Computing Conference (IWCMC), 2017, pp. 390-395, (Year: 2017).*

(Continued)

*Primary Examiner* — Kari L Schmidt
(74) *Attorney, Agent, or Firm* — Banner & Witcoff, Ltd.

(57) ABSTRACT

Client devices in public workspaces are typically reconfigured to default settings for each new user. Thus, a user may manually pre-configure a publicly accessible client device each time the user accesses a virtual workspace via the device. Systems and methods according to this disclosure provide client device configuration based on user identification. Upon launching a remote access application on a "fresh" client device that has not been configured for remote access, the user may be prompted to provide user identifying information, such as, biometric information. A user identification may be determined based on the user identifying information. Various configuration settings may be determined based on the user identification. The client device may be configured based on the determined configuration settings. After the client device is configured, the user may be prompted for authentication credentials. If the user is successfully authenticated, the user is authorized to access the user's virtual workspace.

18 Claims, 7 Drawing Sheets

(56) References Cited

U.S. PATENT DOCUMENTS

| | | | |
|---|---|---|---|
| 10,637,723 B2* | 4/2020 | Kelley | H04L 41/12 |
| 10,678,526 B2* | 6/2020 | Arya | G06F 8/63 |
| 11,115,211 B2* | 9/2021 | Norman | G06F 9/452 |
| 2007/0094490 A1 | 4/2007 | Lohr | |
| 2008/0002758 A1* | 1/2008 | Schmidt | H04W 28/18 |
| | | | 375/130 |
| 2010/0268831 A1* | 10/2010 | Scott | H04W 12/069 |
| | | | 709/228 |
| 2012/0304267 A1* | 11/2012 | Yamada | G06V 40/70 |
| | | | 726/7 |
| 2015/0006534 A1* | 1/2015 | Konoshima | G06V 10/95 |
| | | | 707/737 |
| 2015/0113626 A1* | 4/2015 | Bocanegra Alvarez | |
| | | | H04L 63/0815 |
| | | | 726/8 |
| 2016/0125490 A1 | 5/2016 | Angal et al. | |
| 2016/0301679 A1* | 10/2016 | Mortimore, Jr. | H04L 63/083 |
| 2016/0302063 A1* | 10/2016 | Ahmed | H04W 12/06 |
| 2016/0306955 A1* | 10/2016 | Martin | G06F 21/34 |
| 2017/0279790 A1* | 9/2017 | Ogawa | H04L 63/083 |
| 2017/0289128 A1* | 10/2017 | Kelley | H04L 63/083 |
| 2018/0077620 A1 | 3/2018 | Hassan | |
| 2018/0337913 A1* | 11/2018 | Mortimore, Jr. | H04L 63/083 |
| 2019/0319941 A1* | 10/2019 | Kelley | H04L 63/1433 |
| 2020/0007530 A1 | 1/2020 | Mohamad Abdul et al. | |
| 2020/0145385 A1* | 5/2020 | Chauhan | H04L 67/02 |

OTHER PUBLICATIONS

Das, Maitraye, et al. "Towards accessible remote work: Understanding work-from-home practices of neurodivergent professionals." Proceedings of the ACM on Human-Computer Interaction 5.CSCW1 (2021): 1-30. (Year: 2021).*

P. Ruiu, G. Caragnano, G. L. Masala and E. Grosso, "Accessing Cloud Services through Biometrics Authentication," 2016 10th International Conference on Complex, Intelligent, and Software Intensive Systems (CISIS), 2016, pp. 38-43. (Year: 2016).*

Jul. 10, 2020—U.S. Non-final Office Action—U.S. Appl. No. 16/566,954.

* cited by examiner

CLIENT DEVICE CONFIGURATION FOR REMOTE DIGITAL WORKSPACE ACCESS

FIELD

Aspects described herein generally relate to computer networking, remote computer access, and hardware and software related thereto. More specifically, one or more aspects describe herein provide client device configuration for remote access to a virtual user workspace.

BACKGROUND

Users typically access their digital or virtual workspaces remotely from a variety of devices and locations. A may access digital workspaces on client devices that may not belong to the user, for example, client devices that are part of a public workspace. Virtual workspaces via a remote access application, such as Citrix Workspace App (CWA) or Citrix receiver, installed on the client devices and configured to enable the client devices to connect to various desktop virtualization services. The desktop virtualization services may be provided by an application store, such as a Citrix StoreFront, that provides an interface for users to access, for example, Citrix XenDesktop and Citrix XenApp virtual desktops and applications remotely.

However, users may also access their virtual workspaces from client devices that might not belong to the user or might not be provided to the user by an employer or company. For example, client devices in a public workspace are accessible to users that may be associated with different companies and organizations. Upon launching a remote access application on the client device, the user may configure the VPN settings based on organization or company specific information. After logging into the VPN, the user may configure the settings for the application store, such as Citrix Storefront. For example, the user may add a user account to CWA by providing a username or email address, and the organization's Citrix Storefront URL. After setting up the configurations for the application store, the user may authenticate by providing a password, biometrics, or two-factor authentication. If the user authenticates successfully, the user is authorized to access the user's virtual workspace.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

According to one aspect, the disclosure relates to a computer-implemented method for configuring a client device for remote digital workspace access. The method includes receiving, by a computing device, first input comprising user identifying information identifying a first user, by the computing device, with a first degree of accuracy based on the first input. The first degree of accuracy is insufficient to authenticate the first user. The method includes configuring a client device based on the identified first user. The method includes receiving second input comprising user authentication information. The method includes authenticating a second user based on the second input. The method also includes authorizing, based on successful authentication of the second user, access to a mobile workspace associated with the authenticated second user and executing on the configured client device. The authorizing of the access to the mobile workspace associated with the second user is based on a determination that the identified first user is the same as the authenticated second user. The configuring the client device includes identifying an authentication portal, and receiving the second input includes receiving the second input via the identified authentication portal. A first authentication portal is identified based on a first user, and a second authentication portal is identified based on a second user. Configuring the mobile workspace includes prepopulating a user identification at the identified authentication portal, and not prepopulating any authentication data at the identified authentication portal. The user identifying information includes biometric data. The biometric data includes at least one of a voice sample, a retinal scan, a fingerprint, or feature recognition data. Identifying the first user includes matching the biometric data of the first input with stored biometric data corresponding to the first user. The stored biometric data corresponding to the first user was previously provided by the first user. The identifying of the first user based on the first input includes identifying an entity that is associated with the first user, and configuring of the client device is based on the identified entity.

According to certain aspects of the present disclosure, a system for configuring a client device for remote digital workspace access. The system includes one or more processors. The system includes a memory storing computer-readable instructions that, when executed by the one or more processors, configure the one or more processors to receive, by a computing device, first input comprising user identifying information. The one or more processors are configured to identify a first user, by the computing device, with a first degree of accuracy based on the first input. The first degree of accuracy is insufficient to authenticate the first user. The instructions configure the processors to configure a client device based on the identified first user. The processors are configured to receive second input comprising user authentication information. The processors are configured to authenticate a second user based on the second input. The processors are configured to authorize, based on successful authentication of the second user, access to a mobile workspace associated with the authenticated second user and executing on the configured client device. The authorizing of the access to the mobile workspace associated with the second user is based on a determination that the identified first user is the same as the authenticated second user. The configuring the client device includes identifying an authentication portal, and receiving the second input includes receiving the second input via the identified authentication portal. A first authentication portal is identified based on a first user, and a second authentication portal is identified based on a second user. Configuring the mobile workspace includes prepopulating a user identification at the identified authentication portal, and not prepopulating any authentication data at the identified authentication portal. The user identifying information includes biometric data. The biometric data includes at least one of a voice sample, a retinal scan, a fingerprint, or feature recognition data. Identifying the first user includes matching the biometric data of the first input with stored biometric data corresponding to the first user. The stored biometric data corresponding to the first user was previously provided by the first user. The identifying of the first user based on the first input includes identifying an entity that is associated with the first user, and the configuring of the client device is based on the identified entity.

According to certain aspects of the present disclosure, a non-transitory machine readable storage medium including machine-readable instructions for causing a processor to execute a method is provided. The instructions cause the processor to receive a first input comprising user identifying information. The instructions cause the processor to identify a first user, by the computing device, with a first degree of accuracy based on the first input, wherein the first degree of accuracy is insufficient to authenticate the first user. The instructions cause the processor to configure a client device based on the identified first user. The instructions cause the processor to receive second input comprising user authentication information. The instructions cause the processor to authenticate a second user based on the second input. The instructions cause the processor to authorize, based on successful authentication of the second user, access to a mobile workspace associated with the authenticated second user and executing on the configured client device.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards configuring client devices for remote access to digital workspaces. Users typically access their digital workspaces remotely from a variety of devices and locations via a remote access application, such as Citrix Workspace App (CWA). The user may access digital workspaces on client devices that may not belong to the user, for example, client devices that are part of a public workspace. However, before the user can access their digital workspaces, the remote access application, such as CWA, needs to be configured on the client device, and the user might not know or have access and/or configuration information readily available.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected" and similar terms, is meant to include both direct and indirect connecting.

Computing Architecture

Figure 1:
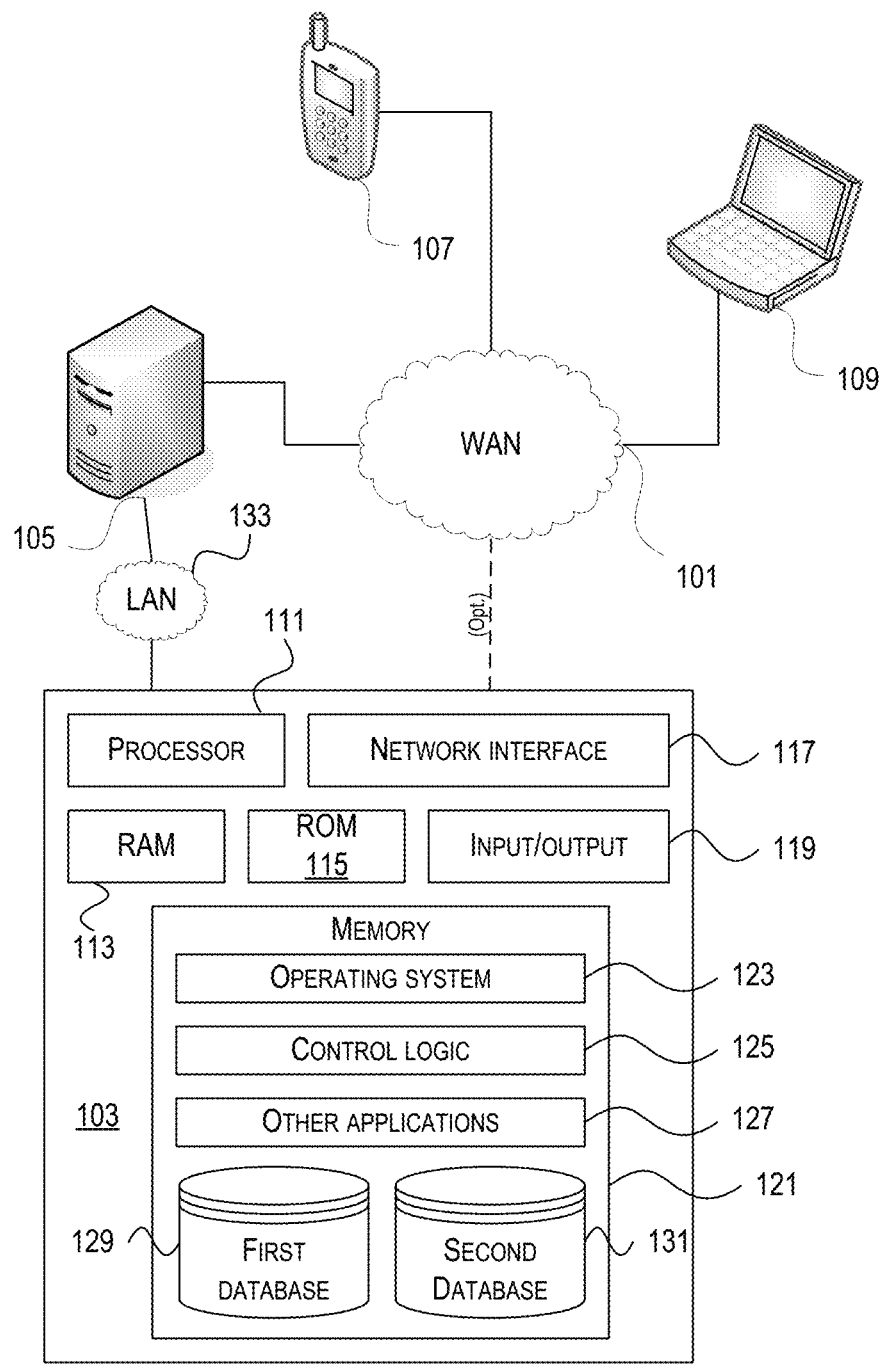
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
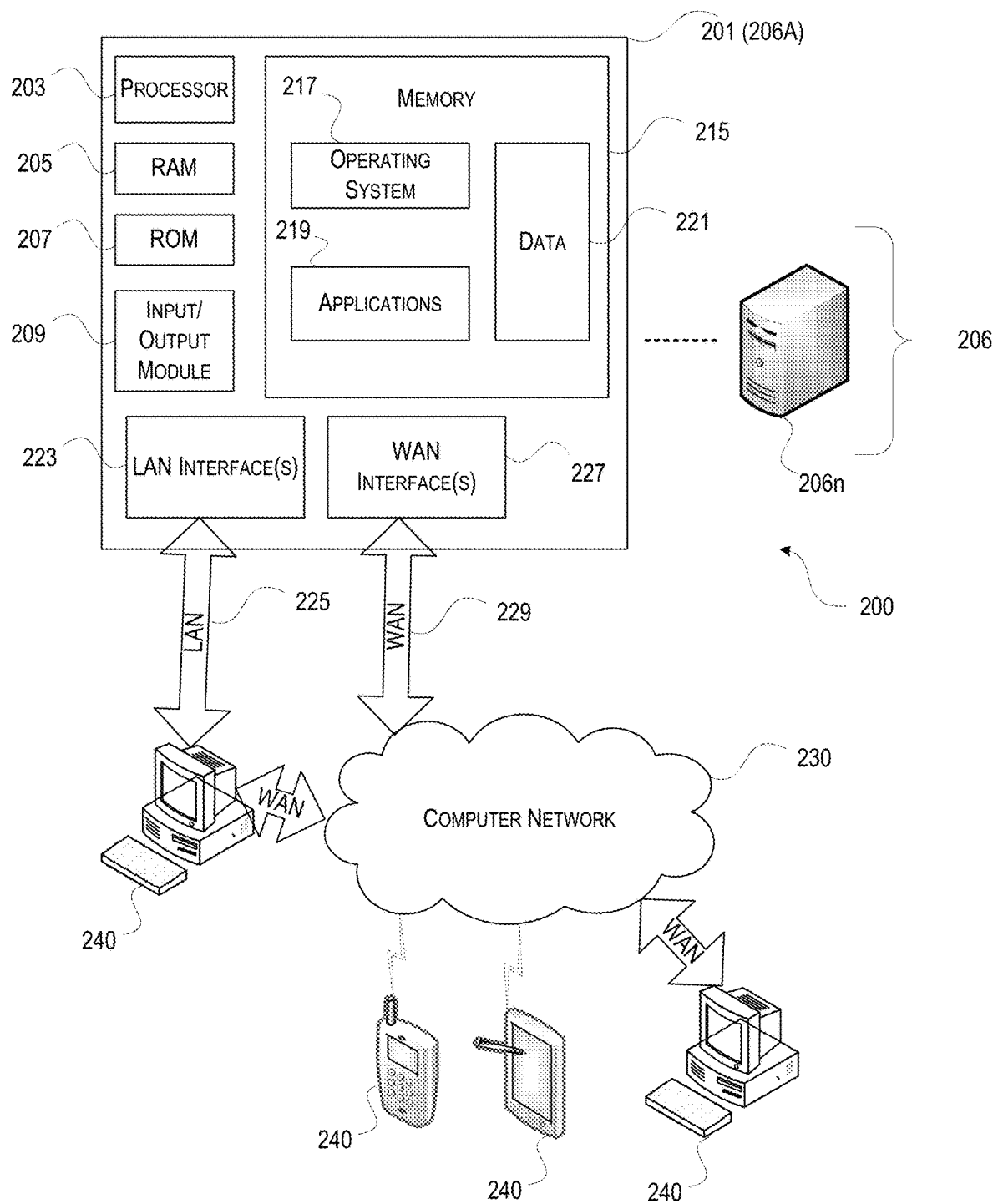
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
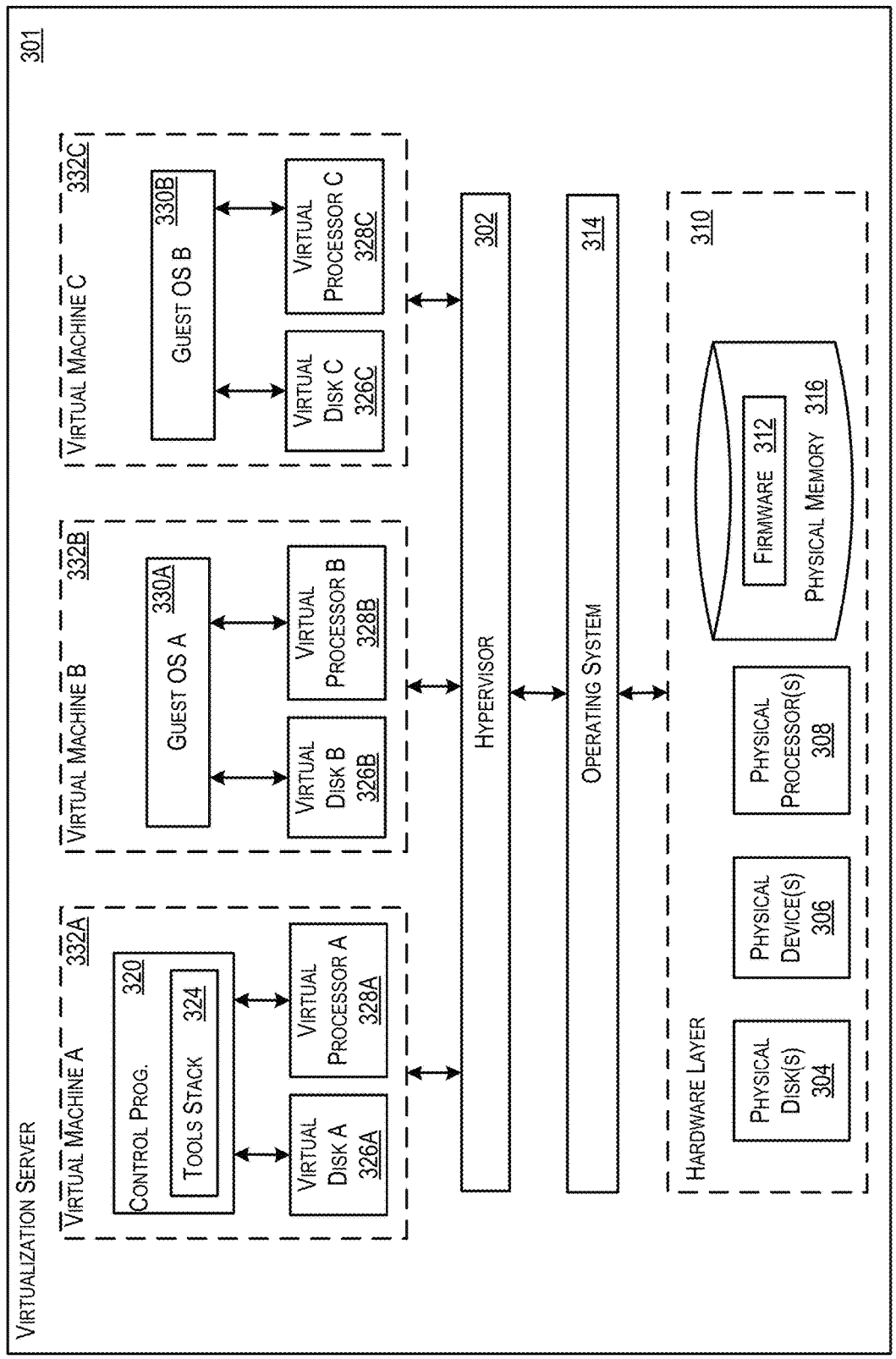
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
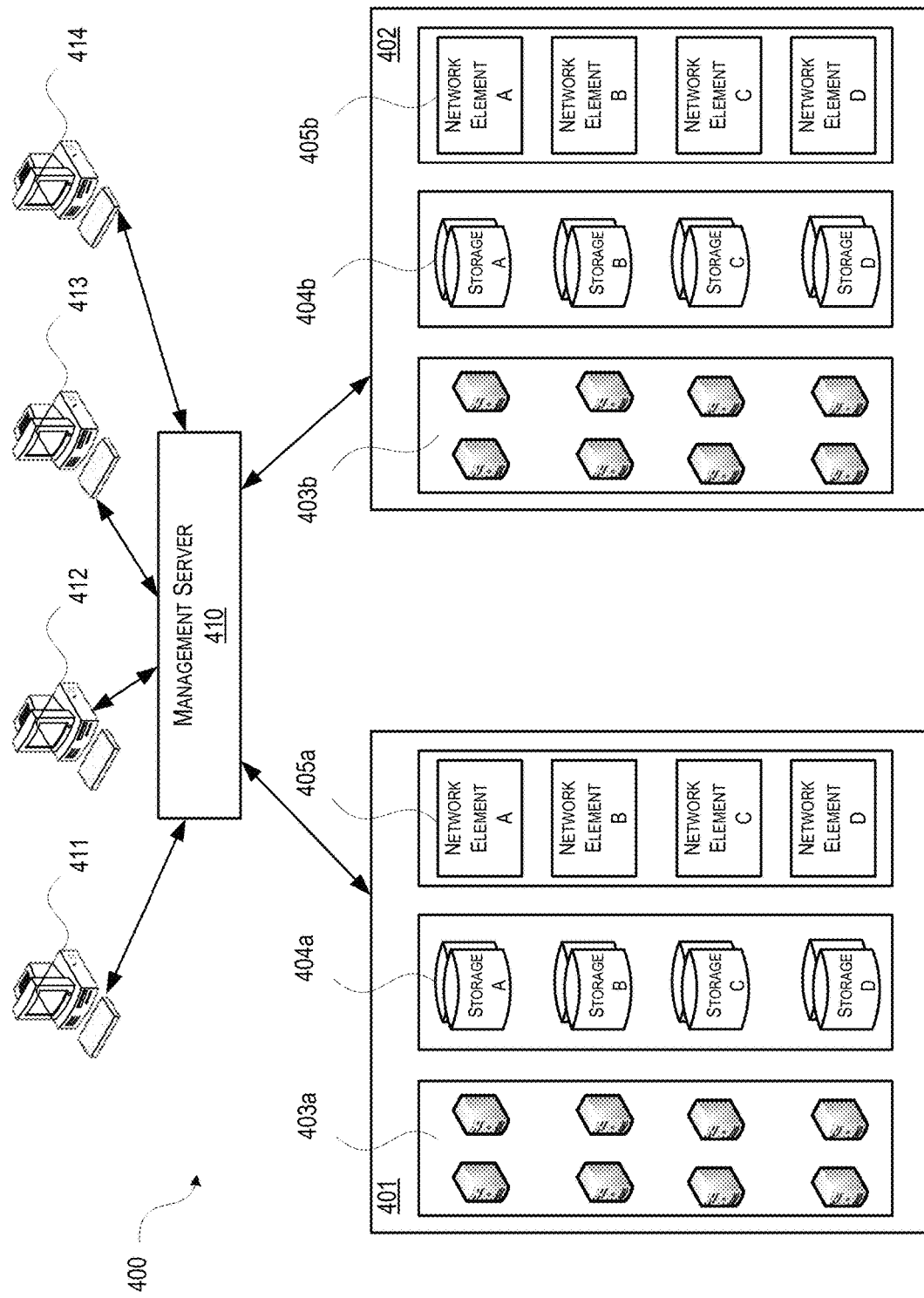
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Configuring Client Devices for Remote Access

Users typically access their digital or virtual workspaces remotely from a variety of devices and locations. Users may access their virtual workspaces via a remote access application, such as Citrix Workspace App (CWA) or Citrix receiver, installed on the client devices and configured to enable the client devices to connect to various desktop virtualization services. The desktop virtualization services may be provided by an application store, such as a Citrix StoreFront, that provides an interface for users to access, for example, Citrix XenDesktop and Citrix XenApp virtual desktops and applications remotely.

A user may access a virtual workspace on a client device that may be provided by the user's employer or company. After launching a remote access application, such as CWA, the user may log into the company's Virtual Private Network (VPN). The VPN settings specific to the employer or company may be pre-configured on the client device. In some instances, the VPN settings may be pre-configured by the company's IT (Information Technology) team. Additionally, the CWA settings, such as, the user's account information, and the company's Citrix Storefront URL, may also be pre-configured on the client device. Other user settings, such as, a user preferred language, a user preferred text editor, accessibility settings, and file type associations may also be pre-configured on the client device. In order access a virtual desktop on a pre-configured client device, the user may launch CWA, and provide a VPN password, and user authentication credentials.

However, users may also access their virtual workspaces from client devices that might not belong to the user, might not be provided to the user by an employer or company, or that simply are not preconfigured with that user's particular configuration data. For example, client devices in a public workspace are accessible to users that may be associated with different companies and organizations. Client devices in public workspaces are typically reconfigured to default settings for each new user. Thus, a user may access a virtual workspace via a publicly accessible client device by manually configuring the client device. Upon launching a remote access application on the client device, the user may configure the VPN settings based on organization or company specific information. After logging into the VPN, the user may configure the settings for the application store, such as Citrix Storefront. For example, the user may add a user account to CWA by providing a username or email address, and the organization's Citrix Storefront URL. After setting up the configurations for the application store, the user may authenticate by providing a password, biometrics, or two-factor authentication. If the user authenticates successfully, the user is authorized to access the user's virtual workspace. However, after successful authentication, the user may also set up additional user specific settings on the client device, such as, a user preferred language, a user preferred text editor, font sizes, etc.

For users that frequently access their virtual workspaces from publicly accessible client devices, the process of manually configuring the client device each time they wish to access a virtual workspace can be tedious and cumbersome. Additionally, the user might not readily have access to the organization or company specific VPN information or the company's Storefront URL. Further, users might not be sufficiently "tech savvy" to fully or even partially manually configure the client device. Additionally, the organization or company specific VPN and/or CWA information or the Storefront URL may not always be the same. An organization may push changes to the configuration settings to client devices over the network. However, this is not possible on publicly accessible client devices, because the client devices do not belong to the organization. Thus, requiring manual configuring of a client device often negatively impacts user experience and productivity.

In some instances, a VPN connection may support and enable single-sign-on authentication processes. When the user logs into the company VPN, a single-sign-on processes may allow a user to provide a single set of authentication credentials, which may then be verified by an authentication service. The authentication service may then grant the user access to multiple enterprise resources without requiring the user to provide authentication credentials for each individual resource. However, for publicly accessible client devices, even after single-sign-on, the client devices still need to be configured for various applications and services. Email based discovery may be used for mapping user email addresses to storefront URLs. However, the storefront URL information may not be useful for accompanying services such as a NetScaler plugin, Sharefile, etc. Additionally, email based discovery does not enable other aspects of client device configuration, such as setting up the VPN and user specific settings.

Systems and methods according to this disclosure provide client device configuration based on user identification information. Upon launching a remote access application on a "fresh" client device that has not been configured for remote access, the user may be prompted to provide user identifying information, such as, biometric information or other identifying information such as a username, domain, etc. The biometric information may include, without limitation, a fingerprint, voice sample, and/or retinal scan of the user. The user identifying information may be falsified, thus, is used for user identification instead of authentication. A user identification may be determined based on the user identifying information. The user's biometrics may identify a single user, a group of users, an organization and/or company. The user's biometrics may identify that the user is associated with a specific organization. Various configuration settings, such as company specific VPN information, Storefront username and URL, and other user specific settings, such as, a user preferred language, a user preferred text editor, accessibility settings, and file type associations may be determined based on the user identification. The client device may be configured based on the determined configuration settings. After the client device is configured, the user may be prompted for authentication credentials, such as, a password, additional biometrics, and/or information related to two-factor authentication. If the user is successfully authenticated, the user is authorized to access the user's virtual workspace. Thus, systems and methods according to the present disclosure identify a likely user of the client device, and retrieve non-sensitive configuration information associated with the identified likely user of the client device, such as, the identified likely user's preferred language, file type associations, accessibility settings, storefront URL of the likely user's virtual workspace, VPN URL, username, etc. The non-sensitive configuration information may be provided by an identification service that the user previously enrolls in by providing user identifying information, such as, the user's biometrics or other identifying information. Implementations according to this disclosure enable users to work on CWA enabled public terminals regardless of the organization they belong to, with minimal IT setup, thus, furthering the goal of enabling users to work anytime from anywhere.

Figure 5:
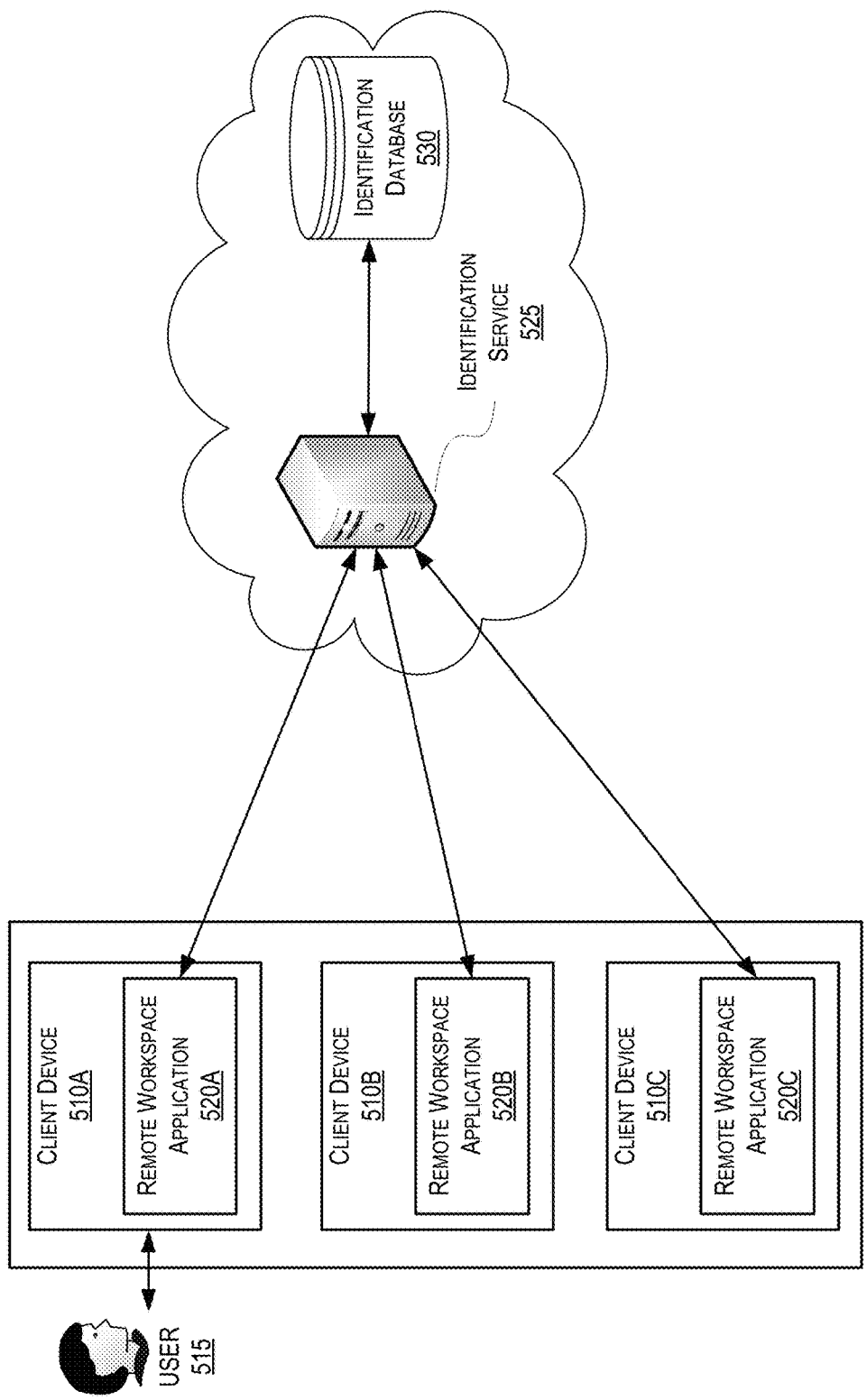
FIG. 5 depicts an illustrative environment in which client device configuration based on user identification is provided in accordance with one or more illustrative aspects described herein.

FIG. 5 depicts an illustrative environment 500 in which client device configuration based on user identification is provided in accordance with one or more illustrative aspects described herein. The environment 500 includes three client devices 510a-c (generally referred to as client devices 510). The client devices 510 may be publicly accessible client devices. Thus, the client devices 510 are configured with default settings for each new user. Remote workspace applications 520a-c may be installed respectively on each of the client devices 510. A user 515 may launch the first remote access application 520a on the first client device. In response, the user 515 may be prompted to provide user identifying information. In some implementations, the user identifying information may be biometric information, and the user 515 may be prompted to provide a voice sample, a fingerprint, etc. Facial recognition and/or retinal scan technology may also be deployed for gathering user identifying information from the user 515. The user 515 may be identified based on the provided user identifying information. The environment 500 includes an identification service 525. The identification service 525 may be a server as shown in FIG. 2. The identification service 525 may interface with an identification database 530. The identification service 525 may determine a user identification based on the user identifying information provided by the user 515, such as the collected user biometrics. Users, such as the user 515, or groups of users, such as organizations or companies, may voluntarily register or delete their user identifying information from the identification database 530. The user identifying information may include user biometrics. Based on the user identifying information of the user 515, the identification service 525 may identify a single user, such as the user 515 and/or a group of users, such as users associated with a specific organization. Based on the user identification, configuration information associated with the user identification may be retrieved. If the user identification identifies a single user, then the configuration information may include settings that are specific to the identified single user. If the user identification identifies a group, such as an organization, then the configuration information may include settings that are specific to that organization. Various configuration settings, such as company specific VPN information, Storefront username and URL, and other user specific settings, such as, a user preferred language, a user preferred text editor, accessibility settings, and file type associations may be determined based on the user identification. The first client device 510a may be configured based on the retrieved configuration information associated with the user identification. After the first client device 510a is configured according to the configuration information, the user 515 may be prompted for user authentication information. The user authentication information may be a password, additional biometrics, and/or information related to two-step authentication. If the configuration information identifies a VPN connection, the user 515 may be prompted for a password for access to the VPN. The user 515 may be authorized to access the user's virtual workspace based on a successful authentication of the user.

Figure 6:
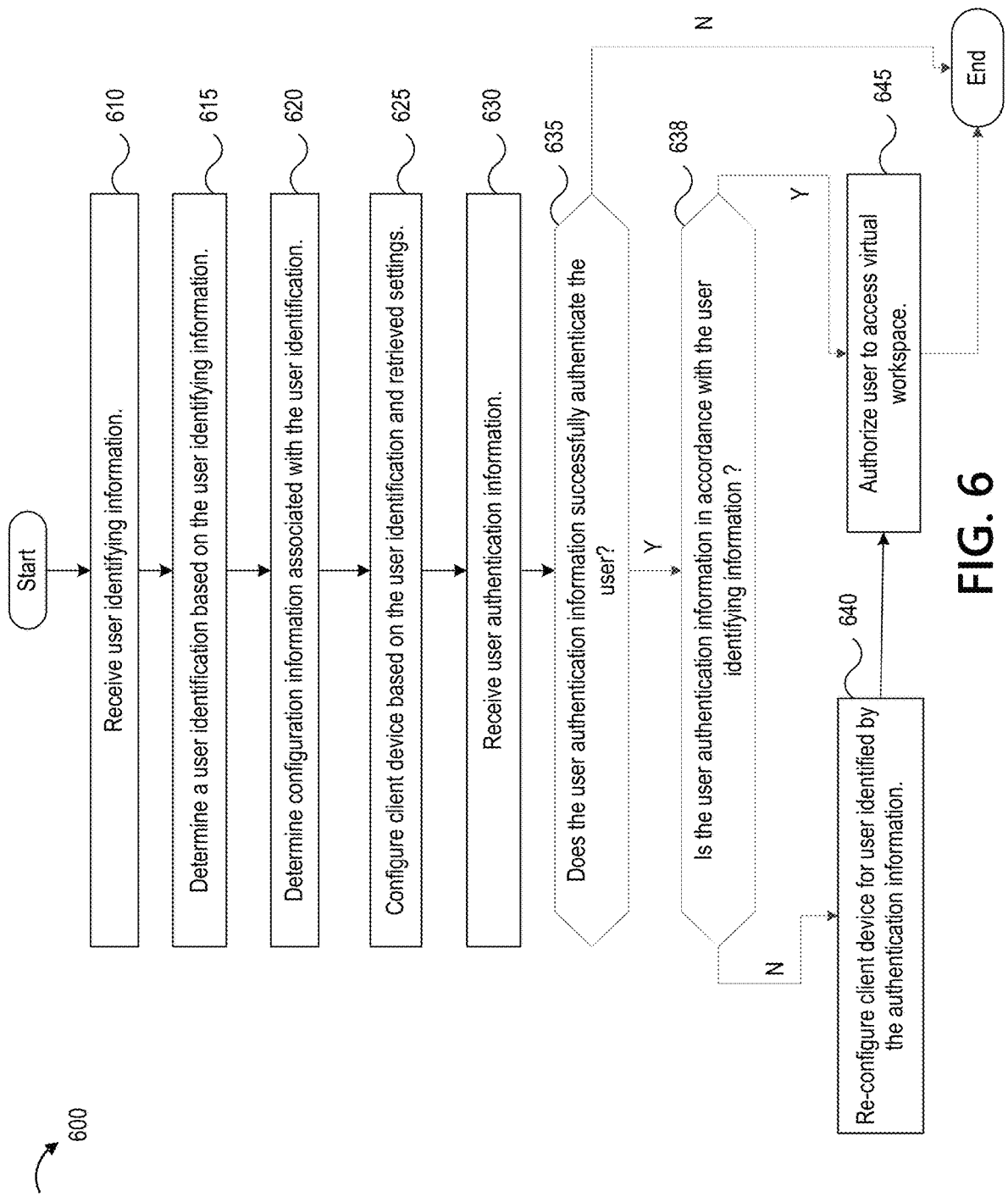
FIG. 6 depicts an illustrative process for client device configuration based on user identification performed by the example system shown in FIG. 5.

FIG. 6 depicts an illustrative process 600 for client device configuration based on user identification performed by the example system shown in FIG. 5. While FIG. 6 is described with reference to FIG. 5, it should be noted that the method steps of FIG. 6 may be performed by other systems.

A user 515 may launch a first remote workspace application 520*a* on a first client device 510*a*. The first client device 510*a* may be a publicly accessible device and therefore, may not be configured for the user 515. At stage 610, the process 600 includes prompting the user 515 to provide user identifying information. The user identifying information may be biometric information or other identifying information such as a username, domain, etc. In some implementations, the user 515 may be prompted to provide a voice sample, a fingerprint, etc. Facial recognition and/or retinal scan technology may also be deployed to gather user identifying information from the user 515.

At stage 615, the process 600 includes determining a user identification based on the user identifying information provided by the user 515. The user identification may be determined by the identification service 525 based on the user identifying information. The user identifying information may be biometric information or other identifying information such as a username, domain, etc. The identification service 525 may interface with an identification database 530. The identification database 530 may store various non-sensitive information previously provided by users, such as the user 515, or groups of users, such as organizations or companies. Users and other entities may voluntarily provide or delete their user identifying information from the identification database 530. The user identifying information may include user biometrics, such as fingerprint, retinal, and/or voice data. The user identifying information may include biometric information or other identifying information such as a username, domain, etc. Based on the user identifying information provided by the user 515, the identification service 525 may determine a user identification. The user identifying information provided by the user 515 may be insufficient for authenticating the user 515. The identification service 525 may identify a single user, such as the user 515. In some implementations, the identification service 525 may identify, based on the user identifying information, a group of users, such as users associated with a specific organization. For example, the user identifying information may be a username or domain which may identify an organization or employer.

Referring back to FIG. 6, at stage 620, the process 600 includes determining client device configuration information associated with the user identification. If the user identification identifies a single user, then the configuration information may include settings that are specific to the identified single user. If the user identification identifies a group, such as an organization, then the configuration information may include settings that are specific to that organization. Various configuration settings, such as company specific VPN information, Storefront username and URL, and other user specific settings, such as, a user preferred language, a user preferred text editor, accessibility settings, and file type associations may be determined based on the user identification.

At stage 625, the process 600 includes configuring the first client device 510*a* based on the configuration information associated with the user identification. The first client device 510*a* may be configured based on the retrieved configuration information associated with the user identification. After the first client device 510*a* is configured according to the configuration information, at stage 630, the process 600 may prompt the user 515 for user authentication information. The user authentication information may be a password, additional biometrics, and/or information related to two-step authentication. If the configuration information identifies a VPN connection, the user 515 may be prompted for a password for access to the VPN. At stage 635, the process 600 may determine whether the user authentication information provided by the user 515 successfully authenticates the user 515. If the user authentication information does not successfully authenticate the user 515, then the process 600 ends. If the user authentication information successfully authenticates the user 515, then at stage 638, the process 600 may determine whether the user authentication information is in accordance with the user identifying information. The user identifying information is insufficient to authenticate a user because it may be possible to falsify user identifying information, such as a username, domain, and some types of user biometrics. However, the user identifying information is sufficient for pre-configuration of the client device. If the user identifying information identifies a group of users, such as an organization, then the user authentication information should authenticate a user that belongs to the identified group of users. If the authentication information does not match or is otherwise not in accordance with the user identifying information then at stage 640, the process 600 includes reconfiguring the client device for the authenticated user. If the authentication information matches or is otherwise in accordance with the user identifying information then at stage 645, the process 600 includes authorizing the user 515 to access the virtual workspace via the remote workspace application 520*a* executing on the first client device 510*a*.

Figure 7:
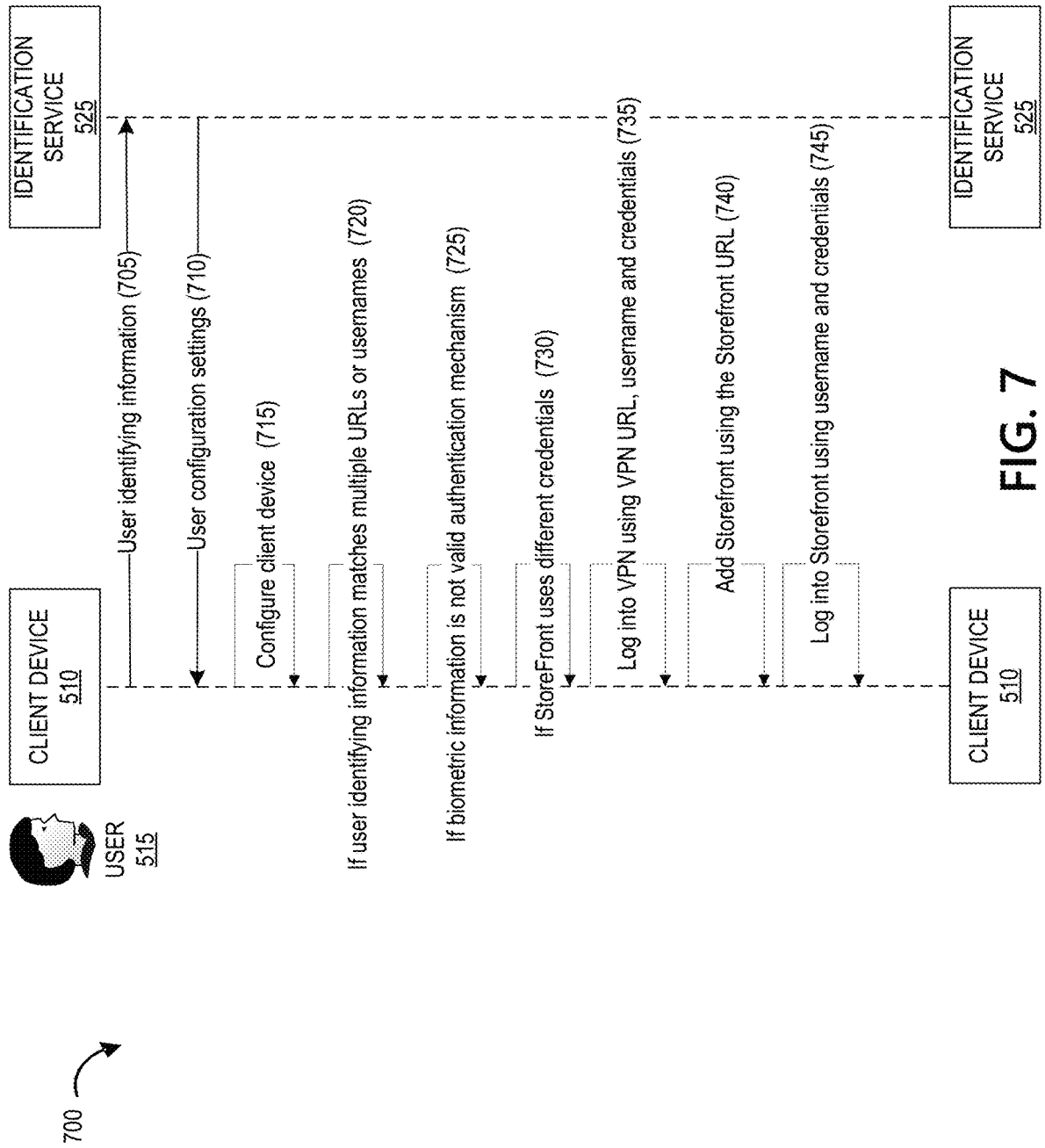
FIG. 7 depicts another illustrative process for client device configuration based on user identification performed by the example system shown in FIG. 5.

FIG. 7 depicts another illustrative process 700 for client device configuration based on user identification performed by the example system shown in FIG. 5. While FIG. 7 is described with reference to FIG. 5, it should be noted that the method steps of FIG. 7 may be performed by other systems.

A user 515 may launch a first remote workspace application 520*a* on a first client device 510*a*. The first client device 510*a* may be a publicly accessible device and therefore, may not be configured for the user 515. The user 515 is prompted to provide user identifying information. The user identifying information may be biometric information, and the user 515 may be prompted to provide a voice sample, a fingerprint, etc. Facial recognition and/or retinal scan technology may also be deployed to gather user identifying information from the user 515.

At stage 705, the process 700 includes sending the user identifying information to the identification service 525. A user identification may be determined by the identification service 525 based on the user identifying information. The identification service 525 may interface with an identification database 530. The identification database 530 may store various non-sensitive information previously provided by users, such as the user 515, or groups of users, such as organizations or companies. Users and other entities may voluntarily provide or delete their user identifying information from the identification database 530. The user identifying information may include user biometrics, such as fingerprint, retinal, and/or voice data. Based on the user identifying information provided by the user 515, the identification service 525 may determine a user identification. The identification service 525 may identify a single user, such as the user 515 and/or a group of users, such as users associated with a specific organization.

At stage 710, the process 700 includes determining client device configuration information associated with the user identification and sending the information to the client device 510. If the user identification identifies a single user, then the configuration information may include settings that are specific to the identified single user. If the user identification identifies a group, such as an organization, then the configuration information may include settings that are specific to that organization. Various configuration settings, such as company specific VPN information, Storefront username and URL, and other user specific settings, such as, a user preferred language, a user preferred text editor, accessibility settings, and file type associations may be determined based on the user identification.

At stage 715, the process 700 includes configuring the first client device 510*a* based on the configuration information associated with the user identification. The first client device 510*a* may be configured based on the retrieved configuration information associated with the user identification.

If the remote access workspace application 520*a* is the Citrix Workspace Application, the user 515 may have one or zero VPN URLs, one storefront URL and one username. In such cases, CWA may automatically provide this identity to itself and to any companion services (such as a NetScaler plugin). However, if a user has multiple identities (usernames) associated with the user, then at stage 720, the process 700 includes prompting the user 515 to select one of the associated URLs or usernames. If the user biometric is suitable for authentication into the client device (e.g. fingerprint, retina, facial recognition, etc.) this can be provided as a credential to the service that is requesting the identity. If the biometric information provided by the user 515 is not suitable for authentication, or there is multi-factor authentication, then at stage 725, the process 700 may include prompting the user 515 for authentication credentials. If multiple services use the same authentication mechanisms, this step may be performed once. In some implementations, instead of relying on user biometrics, the identities are mapped to the user's personal email ID or unique personal username. Other user configurations, such as, preferred language, preferred accessibility settings, file type associations, etc., may also be stored and retrieved. If the StoreFront uses different credentials, then at stage 730, the process 700 may include prompting the user 515 for credentials, such as, a security token, a password, etc. for the StoreFront.

After the first client device 510*a* is configured according to the configuration information, at stage 735, the process 700 includes prompting the user 515 for user authentication information. The user authentication information may be a password, additional biometrics, and/or information related to two-step authentication. If the configuration information identifies a VPN connection, then the user 515 may be prompted for a password for access to the VPN. At stage 740 of the process 700, the user 515 may add the StoreFront URL. At stage 745 of the process 700, the user 515 may log into the StoreFront using the username and credentials, after which the user 515 may be authorized to access the user's virtual workspace based on a successful authentication of the user.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   receiving, by a computing device, first input comprising a first type of biometric data, wherein the first type of biometric data is configured to identify a single user with a first degree of accuracy, and wherein the first degree of accuracy is insufficient to authenticate the single user;
   determining, based on the received first type of biometric data that identifies a first user, client device configuration associated with the first user;
   configuring a client device based on the determined client device configuration;
   after configuring the client device, receiving second input comprising user authentication information;
   authenticating a second user based on the second input; and
   authorizing, based on successful authentication of the second user, access to a mobile workspace associated with the authenticated second user and executing on the configured client device.

2. The method of claim 1, wherein the authorizing the access to the mobile workspace associated with the authenticated second user is further based on a determination that the identified first user is the same as the authenticated second user.

3. The method of claim 1, wherein the configuring the client device comprises identifying an authentication portal, and wherein receiving the second input comprises receiving the second input via the identified authentication portal.

4. The method of claim 3, wherein a first authentication portal is identified based on the first user, and a second authentication portal is identified based on the second user.

5. The method of claim 3, wherein the configuring the client device comprises prepopulating a user identification at the identified authentication portal, and not prepopulating any authentication data at the identified authentication portal.

6. The method of claim 1, wherein the user authentication information in the second input comprises a second type of biometric data, and wherein the second type of biometric data is configured to identify a user with a second degree of accuracy, and wherein the second degree of accuracy is sufficient to authenticate a user.

7. The method of claim 1, wherein the determining client device configuration comprises matching the first type of biometric data with stored biometric data corresponding to the first user.

8. The method of claim 7, wherein the stored biometric data corresponding to the first user was previously provided by the first user.

9. The method of claim 1, wherein the determining client device configuration comprises identifying an entity that is associated with the first user, and wherein the configuring of the client device is based on the identified entity.

10. A system comprising:
    one or more processors; and
    memory storing computer-readable instructions that, when executed by the one or more processors, configure the system to:
    receive first input comprising a first type of biometric data, wherein the first type of biometric data is configured to identify a single user with a first degree of accuracy, and wherein the first degree of accuracy is insufficient to authenticate the single user;

determine, based on the received first type of biometric data that identifies a first user, client device configuration associated with the first user;

configure a client device based on the determined client device configuration;

after configuring the client device, receive second input comprising user authentication information;

authenticate a second user based on the second input; and authorize, based on successful authentication of the second user, access to a mobile workspace associated with the authenticated second user and executing on the configured client device.

11. The system of claim 10, wherein the instructions, when executed by the one or more processors, further configure the system to authorize the access to the mobile workspace associated with the second user based on a determination that the identified first user is the same as the authenticated second user.

12. The system of claim 10, wherein the instructions, when executed by the one or more processors, further configure the system to:

configure the client device by identifying an authentication portal, and receive the second input by receiving the second input via the identified authentication portal.

13. The system of claim 12, wherein a first authentication portal is identified based on the first user, and a second authentication portal is identified based on the second user.

14. The system of claim 12, wherein the instructions, when executed by the one or more processors, further configure the system to configure the client device by prepopulating a user identification at the identified authentication portal, and not by prepopulating any authentication data at the identified authentication portal.

15. The system of claim 10, wherein the user authentication information in the second input comprises a second type of biometric data, and wherein the second type of biometric data is configured to identify a user with a second degree of accuracy, and wherein the second degree of accuracy is sufficient to authenticate a user.

16. The system of claim 10, wherein the instructions, when executed by the one or more processors, further configure the system to determine client device configuration by matching the first type of biometric data with stored biometric data corresponding to the first user.

17. The system of claim 10, wherein the instructions, when executed by the one or more processors, further configure the system to:

identify the first user by identifying an entity that is associated with the first user, and configure the client device based on the identified entity.

18. A non-transitory storage medium comprising computer-readable instructions, when executed, cause:

receiving, by a computing device, first input comprising a first type of biometric data, wherein the first type of biometric data is configured to identify a single user with a first degree of accuracy, and wherein the first degree of accuracy is insufficient to authenticate the single user;

determining, based on the received first type of biometric data that identifies a first user, client device configuration associated with the first user;

configuring a client device based on the determined client device configuration;

after configuring the client device, receiving second input comprising user authentication information;

authenticating a second user based on the second input; and authorizing, based on successful authentication of the second user, access to a mobile workspace associated with the authenticated second user and executing on the configured client device.

* * * * *